United States Patent
Fan et al.

(10) Patent No.: US 12,125,450 B2
(45) Date of Patent: Oct. 22, 2024

(54) PIXEL DRIVING CIRCUIT AND ELECTROWETTING DISPLAY

(71) Applicants: Mianyang HKC Optoelectronics Technology Co., Ltd., Mianyang (CN); HKC CORPORATION LIMITED, Shenzhen (CN)

(72) Inventors: Tao Fan, Mianyang (CN); Haijiang Yuan, Mianyang (CN)

(73) Assignees: Mianyang HKC Optoelectronics Technology Co., Ltd., Shenzhen (CN); HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/513,646

(22) Filed: Nov. 20, 2023

(65) Prior Publication Data

US 2024/0087540 A1    Mar. 14, 2024

Related U.S. Application Data (63) Continuation of application No. PCT/CN2023/137320, filed on Jan. 6, 2023.

(30) Foreign Application Priority Data

Mar. 28, 2022    (CN) .......................... 202210309153.9

(51) Int. Cl.
G02B 26/02    (2006.01)
G09G 3/34    (2006.01)

(52) U.S. Cl.
CPC ..... *G09G 3/348* (2013.01); *G09G 2320/0271* (2013.01)

(58) Field of Classification Search
CPC ........... G09G 3/348; G09G 2320/0271; G02B 26/005
USPC .......................................... 359/321
See application file for complete search history.

(56) References Cited

U.S. PATENT DOCUMENTS

2008/0062499 A1*    3/2008    Choi ................... G02B 26/005
359/321

FOREIGN PATENT DOCUMENTS

| CN | 101963733 A | 2/2011 |
|---|---|---|
| CN | 102129843 A | 7/2011 |
| CN | 104025179 A | 9/2014 |
| CN | 109597262 A | 4/2019 |
| CN | 114446253 A | 5/2022 |
| JP | 2010085817 A | 4/2010 |
| TW | 201128223 A | 8/2011 |

OTHER PUBLICATIONS

Chinese First Office Action, Chinese Application No. 202210309153.9, mailed Aug. 30, 2022 (15 pages).

(Continued)

*Primary Examiner* — Abdul-Samad A Adediran (57) ABSTRACT

The pixel driving circuit includes a sequential control unit, a first switch unit, a second switch unit, and a power supply unit. The power supply unit provides a constant driving voltage. In one control period, a voltage difference between a first electrode and a second electrode of the electrowetting pixel device is flipped to prevent the first electrode and the second electrode of the electrowetting pixel device from problems of charge trapping and ink splitting due to charge accumulation.

17 Claims, 3 Drawing Sheets

(56) References Cited

OTHER PUBLICATIONS

Notification to Grant Patent Right for Invention, Chinese Application No. 202210309153.9, mailed Oct. 9, 2022 (6 pages).
International Search Report, International Application No. PCT/CN2022/137320, mailed Mar. 31, 2023 (14 pages).

* cited by examiner

PIXEL DRIVING CIRCUIT AND ELECTROWETTING DISPLAY

CROSS-REFERENCE TO RELATED APPLICATIONS

The present application is a continuation-application of International (PCT) Patent Application No. PCT/CN2022/137320 filed on Jan. 6, 2023, which claims foreign priority to Chinese Patent Application No. 202210309153.9, filed on Mar. 28, 2022, the contents of which are herein incorporated by reference in their entireties.

TECHNICAL FIELD

The present disclosure relates to the field of display technology, and in particular to a pixel driving circuit and an electrowetting display.

BACKGROUND

Existing mainstream displays are mainly LCD (Liquid Crystal Display) displays and OLED (Organic Light-Emitting Diode) displays. While LCD displays may require backlight modules as their light sources, OLED displays as organic light-emitting materials may perform active emitting in the excited state. Since the performance of displays is susceptible to ambient light, both LCD displays and OLED displays may have to increase brightness to improve the display performance in the case of strong ambient light.

An electrowetting display may still ensure a good visible display under strong light because its display principle lies on reflective luminescence. Electrowetting displays have found their own niche in the field of display technology due to their advantages including but not limited to portability, thinness, flexibility, high contrast, low power consumption, and fast response. In recent years, the research on electrowetting displays has made rapid progress; however, the electrowetting displays currently still have problems with charge trapping and ink splitting.

SUMMARY OF THE DISCLOSURE

In a first aspect, an embodiment of the present disclosure may provide a pixel driving circuit, configured for an electrowetting display, and include a sequential control unit, a first switch unit, a second switch unit, and a power supply unit. The sequential control unit may be electrically connected to a control end of the first switch unit and a control end of the second switch unit. The first switch unit may be in-series connected between a first electrode of the electrowetting pixel device and ground, and the second switch unit may be in-series connected between a second electrode of the electrowetting pixel device and ground. The power supply unit may be electrically connected to the first electrode of the electrowetting pixel device and the second electrode of the electrowetting pixel device.

The power supply unit may be configured to provide a constant driving voltage. The sequential control unit may be configured to periodically control the first switch unit and the second switch unit. One control period may include a first time period and a second time period. During the first time period, the sequential control unit may control the first switch unit to be turned on and the second switch unit to be turned off, and the first electrode of the electrowetting pixel device may be conducted to ground. During the second time period, the sequential control unit may control the first switch unit to be turned off and the second switch unit to be turned on, and the second electrode of the electrowetting pixel device may be conducted to ground.

In one possible implementation of the first embodiment, the control period may further include a third time period and a fourth time period. During the third time period, the sequential control unit may control the first switch unit to be turned on and the second switch unit to turned on, and each of the first electrode and the second electrode of the electrowetting pixel device may be conducted to ground. During the fourth time period, the sequential control unit may control the first switch unit to be turned off and the second switch unit to be turned off, and each of the first electrode and the second electrode of the electrowetting pixel device may be conducted to the power supply unit. The third time period may be between the first time period and the second time period, or, a fourth time period may be between the first time period and the second time period.

In one possible implementation of the first embodiment, the pixel driving circuit may further include a first current limiting unit and a second current limiting unit. The first current limiting unit may be in-series connected between the first electrode of the electrowetting pixel device and the power supply unit. The second current limiting unit may be in-series connected between the second electrode of the electrowetting pixel device and the power supply unit.

In one possible implementation of the first embodiment, the first current limiting unit may include a first resistor. The first resistor may be in-series connected between the first electrode of the electrowetting pixel device and the power supply unit.

In one possible implementation of the first embodiment, the second current limiting unit may include a second resistor. The second resistor may be in-series connected between the second electrode of the electrowetting pixel device and the power supply unit.

In one possible implementation of the first embodiment, the first switch unit may include a first switch tube. A control end of the first switch tube may be electrically connected to the sequential control unit. The first switch tube may be in-series connected between the first electrode of the electrowetting pixel device and ground.

In one possible implementation of the first embodiment, the first switch tube may be an N-Metal-Oxide-Semiconductor (NMOS) tube.

In one possible implementation of the first embodiment, the second switch unit may include a second switch tube. A control end of the second switch tube may be electrically connected to the sequential control unit. The second switch tube may be in-series connected between the second electrode of the electrowetting pixel device and ground.

In one possible implementation of the first embodiment, the second switch tube may be an NMOS tube.

In a second aspect, the present disclosure may provide an electrowetting display, including a first substrate, a second substrate, a display panel, and a pixel driving circuit. The pixel driving circuit may include a sequential control unit, a first switch unit, a second switch unit, and a power supply unit. The sequential control unit may be electrically connected to a control end of the first switch unit and a control end of the second switch unit. The first switch unit may be in-series connected between a first electrode of the electrowetting pixel device and ground, and the second switch unit may be in-series connected between a second electrode of the electrowetting pixel device and ground. The power supply unit may be electrically connected to the first electrode of the electrowetting pixel device and the second electrode of the electrowetting pixel device. The power supply unit may be configured to provide a constant driving voltage. The sequential control unit may be configured to periodically control the first switch unit and the second switch unit. One control period may include a first time period and a second time period. During the first time period, the sequential control unit may control the first switch unit to be turned on and control the second switch unit to be turned off, and the first electrode of the electrowetting pixel device may be conducted to ground. During the second time period, the sequential control unit may control the first switch unit to be turned off and the second switch unit to be turned on, and the second electrode of the electrowetting pixel device may be conducted to ground.

The display panel may be disposed between the first substrate and the second substrate. The display panel may include electrowetting pixel devices arranged in arrays. The pixel driving circuit may be electrically connected to the electrowetting pixel device.

BRIEF DESCRIPTION OF THE DRAWINGS

In order to illustrate the technical solutions in the embodiments of the present disclosure more clearly, the following is a brief introduction of the drawings associated with the description of the embodiments. It is obvious that the drawings described as follows are only for some of the embodiments of the present disclosure. For a person of ordinary skills in the art, other drawings may be obtained based on the following drawings without creative work.

In the figure: 100. sequential control unit; 200. first switch unit; 300. second switch unit; 400. power supply unit; 500. electrowetting pixel device; 600. first current limiting unit; 700. second current limiting unit; 601. first substrate; 602. second substrate; 603. display panel; 800. pixel driving circuit; 900. electrowetting display.

DETAILED DESCRIPTION

In the following description, for the purpose of illustrations rather than limitations, specific details such as particular system structures and techniques are presented in order to thoroughly understand the embodiments of the present disclosure. However, it should be clear to those skilled in the art that the present disclosure may be implemented in other embodiments without these specific details. In other cases, the detailed descriptions of well-known systems, devices, circuits, and methods are omitted so that unnecessary details do not interfere with the description of the present disclosure.

It should be understood that the term "comprising" used in the specification and claims of the present disclosure indicates the presence of the described features, wholes, steps, operations, elements, and/or components; however, it does not exclude the presence or addition of one or more other features, wholes, steps, operations, elements, and/or components.

As used in the specification and claims of the present disclosure, the term "if" can be construed, depending on the context, as "when" or "once" or "in response to determining" or "in response to detecting". Similarly, the phrases "if determined" or "if [the described condition or event] is detected" may be interpreted, depending on the context, as "once determined" or "in response to determining" or "once [the described condition or event] is detected" or "in response to detecting [the described condition or event]".

Furthermore, in the specification and claims of the present disclosure, the terms like "first", "second", and "third" are used merely to distinguish rather than indicating or implying relative importance.

References to "an embodiment" or "some embodiments" etc. described in the specification of the present disclosure indicates that one or more embodiments of the present disclosure include particular features, structures, or characteristics described in conjunction with the said embodiments. Therefore, phrases like "in an embodiment", "in some embodiments", and "in some other embodiments" appeared across the specification do not necessarily refer to the identical embodiments, but rather means "one or more but not all embodiments", unless otherwise specifically emphasized. The term "including" does not necessarily refer to the same embodiments. The terms "including," "comprising," "having," and variations thereof refer to "including but not limited to", unless otherwise specifically emphasized.

The principle of an electrowetting pixel device may be described as follows: a direct current driving voltage may be loaded between a first electrode and a second electrode of a electrowetting pixel device so that inks in the electrowetting pixel device may be contracted and expanded to realize the function of optical switching. When no voltage is loaded on the first electrode and the second electrode of the electrowetting pixel device, the inks may expand evenly on the surface layer of the insulating medium, and the electrowetting pixel device may exhibit an ink color of full darkness, i.e., the electrowetting pixel device may be in an "off" state. When the first electrode and the second electrode of the electrowetting pixel device are loaded with the voltage, the ink may start contracting and shrink to a side into a droplet shape under effects of both the driving voltage and a surface tension. The electrowetting pixel device may present a state in which a color of a substrate may be reflected, i.e., the electrowetting pixel device may be in an "open" state.

At present, a driving method for controlling a degree of ink contraction in the electrowetting pixel device may be mainly to adjust the amount of the DC voltage loaded on the first electrode and the second electrode. The larger the voltage is, the larger the degree of ink contraction and the higher the gray-scale brightness of the electrowetting pixel device may be. However, loading the DC voltage on the first electrode and the second electrode of the electrowetting pixel device for a long period of time may likely result in a charge trapping and an ink splitting in the electrowetting pixel device, causing problems such as a deviation in a gray-scale voltage, a slow recovery of the ink, or an unrecoverable ink.

A First Embodiment

Based on the aforementioned problems, an embodiment of the present disclosure may provide a pixel driving circuit

Figure 1:
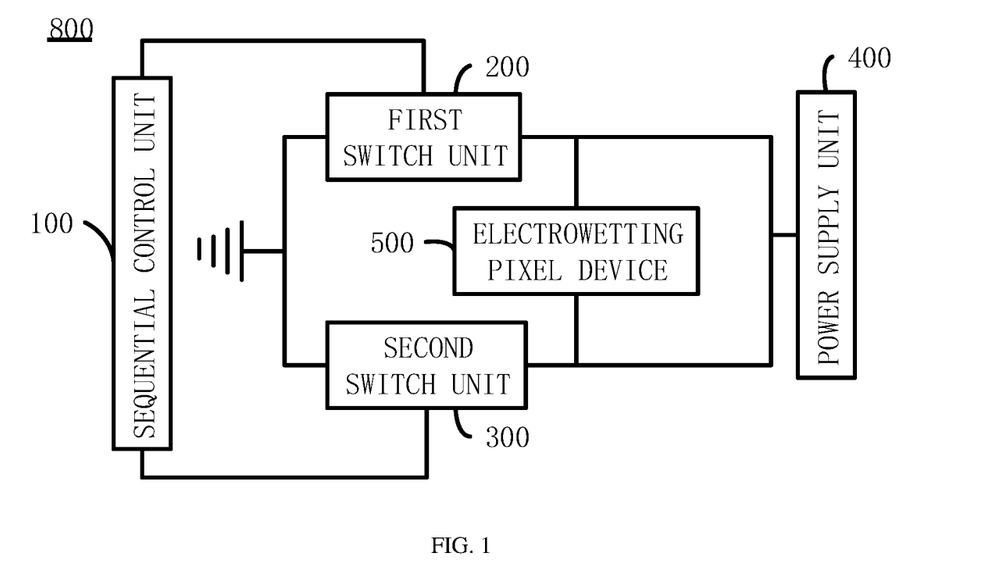
FIG. 1 is a schematic view of an electrowetting pixel device according to an embodiment of the present disclosure.

800 as shown in FIG. 1. The pixel driving circuit 800 may include a sequential control unit 100, a first switch unit 200, a second switch unit 300, and a power supply unit 400. The sequential control unit 100 may be electrically connected to a control end of the first switch unit 200 and a control end of the second switch unit 300. The first switch unit 200 may be in-series connected between a first electrode of an electrowetting pixel device 500 and ground. The second switch unit 300 may be in-series connected between a second electrode of the electrowetting pixel device 500 and ground. The power supply unit 400 may be electrically connected to the first electrode of the electrowetting pixel device 500 and the second electrode of the electrowetting pixel device 500, respectively.

Specifically, when the pixel driving circuit 800 drives the electrowetting pixel device 500, the sequential control unit 100 may periodically control the first switch unit 200 and the second switch unit 300, so that the first switch unit 200 and the second switch unit 300 may periodically be turned on and turned off. One control period may include a first time period and a second time period. During the first time period, the sequential control unit 100 may control the first switch unit 200 to be turned on and the second switch unit 300 to be turned off. The first electrode of the electrowetting pixel device 500 may be conducted to ground, and the second electrode of the electrowetting pixel device 500 may be conducted to the power supply unit 400. A driving voltage output from the power supply unit 400 may drive the electrowetting pixel device 500 to operate. During the second time period, the sequential control unit 100 may control the first switch unit 200 to be turned off and the second switch unit 300 to be turned on. The first electrode of the electrowetting pixel device 500 may be conducted to the power supply unit 400, and the second electrode of the electrowetting pixel device 500 may be conducted to ground. A driving voltage output from the power supply unit 400 may drive the electrowetting pixel device 500 to operate. A voltage difference between the first electrode of the electrowetting pixel device 500 and the second electrode of the electrowetting pixel device 500 may be flipped during one control period, and may avoid problems of the charge trapping and the ink splitting due to accumulation of charges on the first electrode of the electrowetting pixel device 500 and the second electrode of the electrowetting pixel device 500. The voltage difference being flipped indicates that an amount of voltage at the first electrode is greater than an amount of voltage at the second electrode during a time period, and the amount of voltage at the first electrode then becomes smaller than the amount of voltage at the second electrode during another time period.

In an embodiment of the present disclosure, one control period may further include a third time period and a fourth time period. During the third time period, the sequential control unit 100 may control the first switch unit 200 to be turned on and the second switch unit 300 to be turned on, so that both the first electrode and the second electrode of the electrowetting pixel device 500 may be conducted to ground. At this time, the electrowetting pixel device 500 may be not in operation. During the fourth time period, the sequential control unit 100 may control the first switch unit 200 to be turned off and the second switch unit 300 to be turned off, so that both the first electrode and the second electrode of the electrowetting pixel device 500 may be conducted to the power supply unit 400. At this time, the electrowetting pixel device 500 may be not in operation. The third time period may be between the first time period and the second time period, or, the fourth time period may be between the first time period and the second time period.

Specifically, the electrowetting pixel device 500 may be in operation during both the first time period and the second time period. A voltage of the first electrode of the electrowetting pixel device 500 and a voltage of the second electrode of the electrowetting pixel device 500 may flip, i.e. transitioning from no voltage presented at the first electrode while voltage presented at the second electrode to voltage presented at the first electrode while no voltage presented at the second electrode, when the electrowetting pixel device 500 enters from the first time period to the second time period. The electrowetting pixel device 500 may not operate during the third time period and the fourth time period. The third time period being located between the first time period and the second time period, or, the fourth time period being located between the first time period and the second time period, may allow the electrowetting pixel device 500 to transition from an operating state to a non-operating state, and then to transition from the non-operating state to the operating state. A transition may prevent the first electrode of the electrowetting pixel device 500 and the second electrode of the electrowetting pixel device 500 from having the charge trapping problem due to charge accumulation caused by a DC voltage being loaded on the first electrode and the second electrode for a long period of time. The ink in the electrowetting pixel device 500 may be converted from a contracted state to an expanded state, and then converted from the expanded state to the contracted state. Thus, the ink may be contracted and expanded rapidly, and may be prevented from being split.

Figure 2:
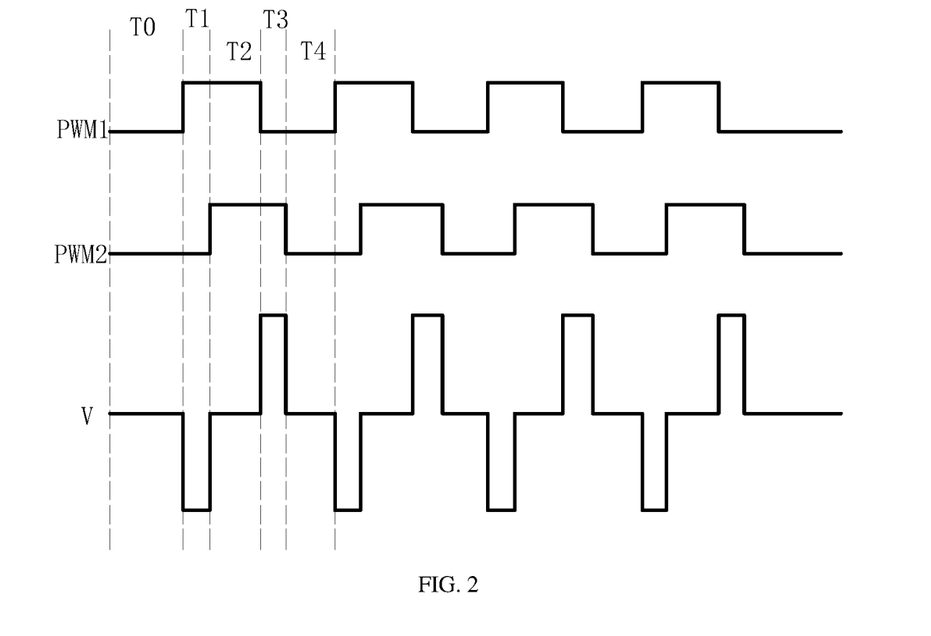
FIG. 2 is a sequence diagram of an electrowetting pixel device driven by pixel driving circuit according to an embodiment of the present disclosure.

Exemplarily, as shown in FIG. 2, a driving cycle of the sequential control unit 100 may include T1, T2, T3, and T4. The sequential control unit 100 may output a first pulse signal PWM1 to control the first switch unit 200, and the sequential control unit 100 may output a second pulse signal PWM2 to control the second switch unit 300.

During the T1 time period, the first pulse signal PWM1 may be at a high voltage level, while the second pulse signal PWM2 may be at a low voltage level. The first switch unit 200 may be turned on, while the second switch unit 300 may be turned off. The voltage of the first electrode of the electrowetting pixel device 500 may be 0, while the voltage of the second electrode of the electrowetting pixel device 500 may be V. The voltage difference between the first electrode of the electrowetting pixel device 500 and the second electrode of the electrowetting pixel device 500 may be −V. The ink in the electrowetting pixel device 500 may contract.

During the T2 time period, the first pulse signal PWM1 may be at a high voltage level, while the second pulse signal PWM2 may be at a high voltage level. The first switch unit 200 may be turned on, while the second switch unit 300 may also be turned on. The voltage of the first electrode of the electrowetting pixel device 500 may be 0, while the voltage of the second electrode of the electrowetting pixel device 500 may also be 0. The voltage difference between the first electrode of the electrowetting pixel device 500 and the second electrode of the electrowetting pixel device 500 may be 0. The ink in the electrowetting pixel device 500 may expand and restore to its original state.

During the T3 time period, the first pulse signal PWM1 may be at a low voltage level, while the second pulse signal PWM2 may be at a high voltage level. The first switch unit 200 may be turned off, while the second switch unit 300 may be turned on. The voltage of the first electrode of the electrowetting pixel device 500 may be V, while the voltage of the second electrode of the electrowetting pixel device 500 may be 0. The voltage difference between the first electrode of the electrowetting pixel device 500 and the second electrode of the electrowetting pixel device 500 may be V. The ink in the electrowetting pixel device 500 may contract.

During the T4 time period, the first pulse signal PWM1 may be at a low voltage level, while the second pulse signal PWM2 may also be at a low voltage level. The first switch unit 200 may be turned off, while the second switch unit 300 may also be turned off. The voltage of the first electrode of the electrowetting pixel device 500 may be V, while the voltage of the second electrode of the electrowetting pixel device 500 may also be V. The voltage difference between the first electrode of the electrowetting pixel device 500 and the second electrode of the electrowetting pixel device 500 may be 0. The ink in the electrowetting pixel device 500 may expand and restore its original state.

A conventional electrowetting pixel device 500 may adjust a gray-scale brightness by changing an output voltage of the power supply unit 400. The pixel driving circuit 800 of the present disclosure may adjust the gray-scale brightness of the electrowetting pixel device 500 by controlling a duty cycle of the first pulse signal PWM1 and a duty cycle of the second pulse signal PWM2. Therefore, adjustment of the gray-scale brightness of the electrowetting pixel device 500 may be achieved by requiring the power supply unit 400 to provide only one constant direct current driving voltage. A requirement of the power supply unit 400 may be lowered and thus reduce the design and production cost of the pixel driving circuit 800.

Figure 3:
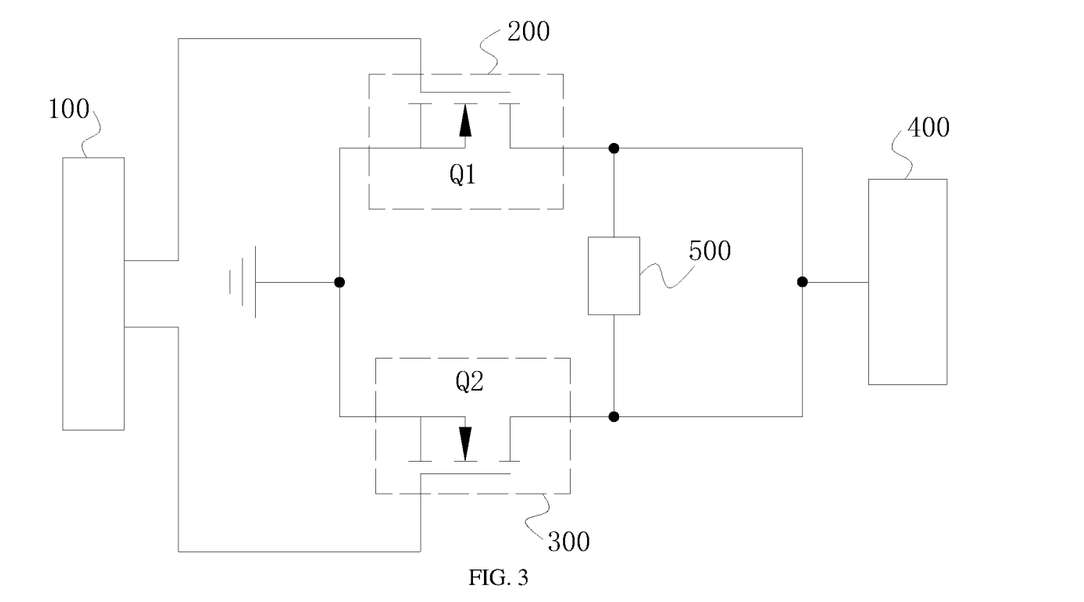
FIG. 3 is a wiring diagram of an electrowetting pixel device according to an embodiment of the present disclosure.

As shown in FIG. 3, the first switch unit 200 may include a first switch tube Q1. A control end of the first switch tube Q1 may be electrically connected to the sequential control unit 100, and the first switch tube Q1 may be in-series connected between the first electrode of the electrowetting pixel device 500 and ground.

Specifically, a first control signal output by the sequential control unit 100 may control the first switch tube Q1 to be turned on or turned off. Exemplarily, when the first control signal output from the sequential control unit 100 is at a high voltage level, the first switch tube Q1 may be turned on and the first electrode of the electrowetting pixel device 500 may be conducted to ground. At this time, the voltage of the first electrode of the electrowetting pixel device 500 may be 0. When the first control signal output from the sequential control unit 100 is at a low voltage level, the first switch tube Q1 may be turned off and the first electrode of the electrowetting pixel device 500 may not be conducted to ground. At this time, the voltage of the first electrode of the electrowetting pixel device 500 may be the driving voltage provided by the power supply unit 400.

Exemplarily, the first switch tube Q1 may be an N-Metal-Oxide-Semiconductor (NMOS) tube.

As shown in FIG. 3, the second switch unit 300 may include a second switch tube Q2. A control end of the second switch tube Q2 may be electrically connected to the sequential control unit 100, and the second switch tube Q2 may be in-series connected between the second electrode of the electrowetting pixel device 500 and ground.

Specifically, the second control signal output by the sequential control unit 100 may control the second switch tube Q2 to be turned on or turned off. Exemplarily, when the second control signal output from the sequential control unit 100 is at a high voltage level, the second switch tube Q2 may be turned on and the second electrode of the electrowetting pixel device 500 may be conducted to ground. At this time, the voltage of the second electrode of the electrowetting pixel device 500 may be 0. When the second control signal output from the sequential control unit 100 is at a low voltage level, the second switch tube Q2 may be turned off and the second electrode of the electrowetting pixel device 500 may not be conducted to ground. At this time, the voltage of the second electrode of the electrowetting pixel device 500 may be the driving voltage provided by the power supply unit 400.

Exemplarily, the second switch tube Q2 may be an NMOS tube.

A Second Embodiment

Figure 4:
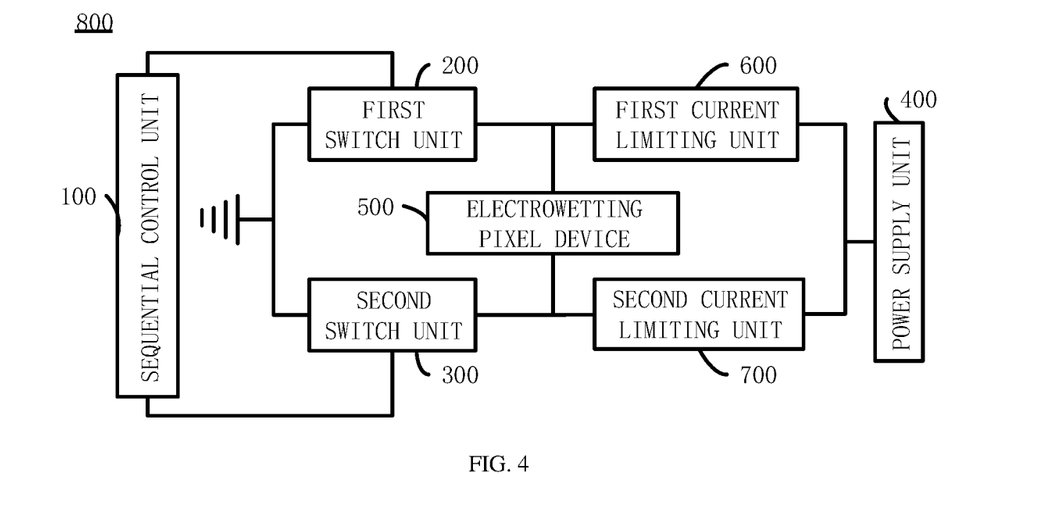
FIG. 4 is a schematic view of an electrowetting pixel device according to another embodiments of the present disclosure.

FIG. 4 illustrates a schematic view of an electrowetting pixel device 500 according to another embodiment of the present disclosure. As shown in FIG. 4, a pixel driving circuit 800 may further include a first current limiting unit 600 and a second current limiting unit 700. The first current limiting unit 600 may be in-series connected between a first electrode of the electrowetting pixel device 500 and a power supply unit 400. The second current limiting unit 700 may be in-series connected between a second electrode of the electrowetting pixel device 500 and the power supply unit 400.

Specifically, the driving voltage output by the power supply unit 400 may be loaded on the first electrode of the electrowetting pixel device 500 through the first current limiting unit 600. The driving voltage output from the power supply unit 400 may be loaded on the second electrode of the electrowetting pixel device 500 through the second current limiting unit 700. The first current limiting unit 600 and the second current limiting unit 700 may limit current to prevent damage to the electrowetting pixel device 500 caused by excessive current flowing through the electrowetting pixel device 500.

Figure 5:
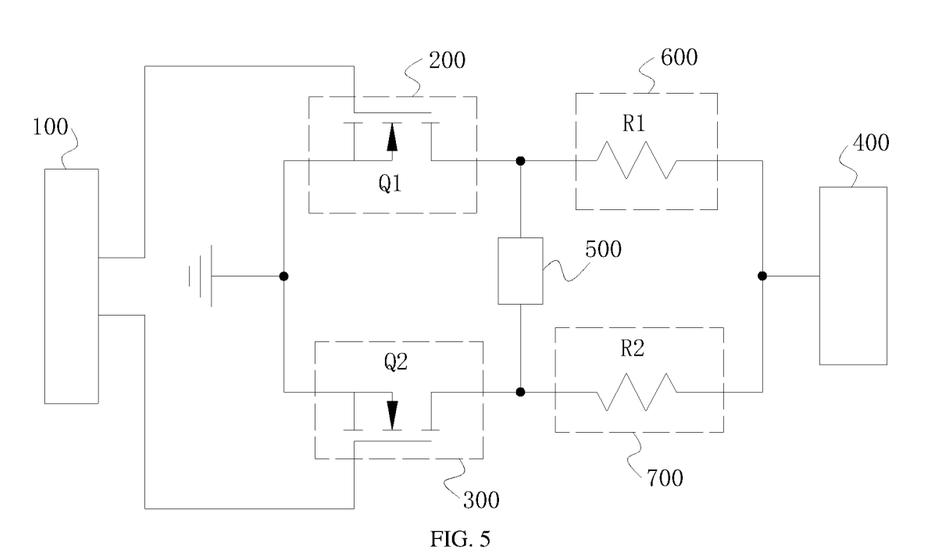
FIG. 5 is a wiring diagram of an electrowetting pixel device according to another embodiment of the present disclosure.

As shown in FIG. 5, the first current limiting unit 600 may include a first resistor R1. The first resistor R1 may be in-series connected between the first electrode of the electrowetting pixel device 500 and the power supply unit 400. The second current limiting unit 700 may include a second resistor R2. The second resistor R2 may be in-series connected between the second electrode of the electrowetting pixel device 500 and the power supply unit 400.

Specifically, designers may determine a resistance value for each of the first resistor R1 and a resistance value for the second resistor R2 based on an actual need to realize the proper current limiting effect and protect the electrowetting pixel device 500 from being damaged.

The Third Embodiment

Figure 6:
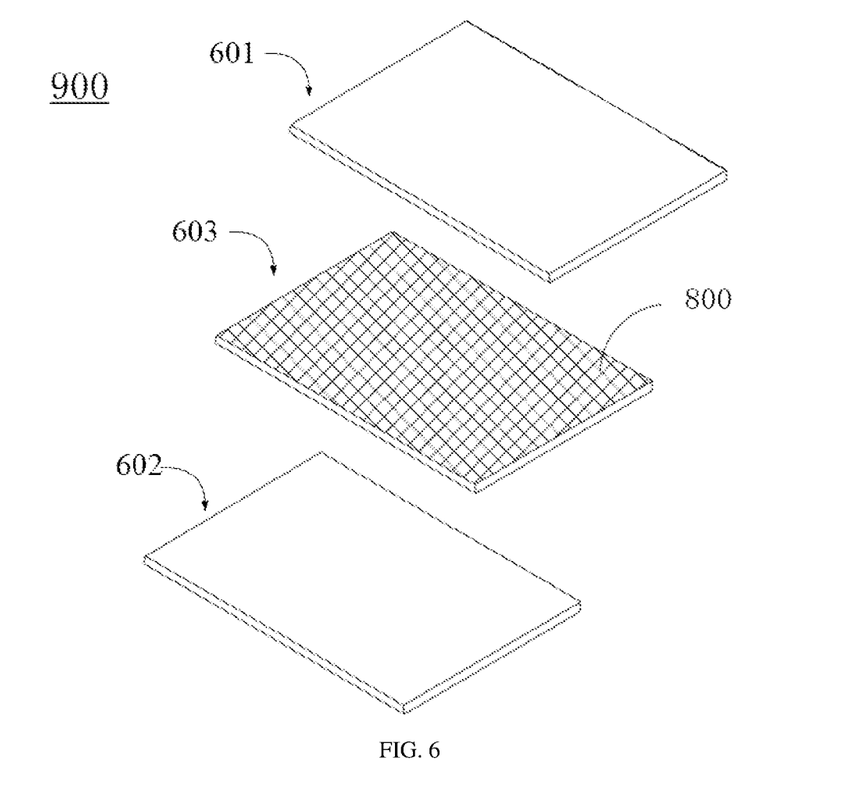
FIG. 6 is a schematic view of an electrowetting display according to an embodiment of the present disclosure.

FIG. 6 illustrates a schematic view of an electrowetting display 900 according to an embodiment of the present disclosure. As shown in FIG. 6, the electrowetting display 900 may include a first substrate 601, a second substrate 602, a display panel 603, and the pixel driving circuit 800 described above. The display panel 603 may be disposed between the first substrate 601 and the second substrate 602. The display panel 603 may include electrowetting pixel devices arranged in arrays, and the pixel driving circuit 800 may be electrically connected to the electrowetting pixel devices. The electrowetting display 900 may be capable of solving the problems of charge trapping and ink splitting existing in the conventional electrowetting displays. The specific principles may be referred to the aforementioned description of the pixel driving circuit 800 and may not be repeated herein.

The above-described embodiments may only be used to illustrate the technical solutions of the present disclosure, but not to limit them; although the present disclosure may be described in details with reference to the foregoing embodiments, any person of ordinary skill in the art should understand that it may still be possible to make modifications to the technical solutions presented in the foregoing embodiments, or to make equivalent replacements for some of the technical features; and these modifications or replacements may not depart from the spirit and scope of the technical solutions of the various embodiments of the present disclosure, and should be included in the scope of protection of the present disclosure.

What is claimed is:

1. A pixel driving circuit, configured for an electrowetting display and comprising: a sequential control unit, a first switch unit, a second switch unit, and a power supply unit; wherein the sequential control unit is electrically connected to a control end of the first switch unit and a control end of the second switch unit; the first switch unit is in-series connected between a first electrode of the electrowetting pixel device and ground, and the second switch unit is in-series connected between a second electrode of the electrowetting pixel device and the ground; the power supply unit is electrically connected to the first electrode of the electrowetting pixel device and the second electrode of the electrowetting pixel device;

the power supply unit is configured to provide a constant driving voltage; the sequential control unit is configured to periodically control the first switch unit and the second switch unit; one control period comprises a first time period and a second time period; during the first time period, the sequential control unit controls the first switch unit to be turned on and controls the second switch unit to be turned off, and the first electrode of the electrowetting pixel device is conducted to the ground; during the second time period, the sequential control unit controls the first switch unit to be turned off and the second switch unit to be turned on, and the second electrode of the electrowetting pixel device is conducted to the ground;

the one control period further comprises a third time period and a fourth time period; during the third time period, the sequential control unit controls the first switch unit to be turned on and the second switch unit to be turned on, and each of the first electrode of the electrowetting pixel device and the second electrode of the electrowetting pixel device is conducted to the ground; during the fourth time period, the sequential control unit controls the first switch unit to be turned off and the second switch unit to be turned off, and each of the first electrode of the electrowetting pixel device and the second electrode of the electrowetting pixel device is conducted to the power supply unit; the third time period is between the first time period and second time period, or the fourth time period is between the first time period and the second time period.

2. The pixel driving circuit according to claim 1, wherein a voltage difference between the first electrode of the electrowetting pixel device and the second electrode of the electrowetting pixel device is flipped during the one control period.

3. The pixel driving circuit according to claim 1, wherein the electrowetting pixel device is in an operating state during the first time period and the second period; the electrowetting pixel device is in a non-operating state during the third time period and the fourth time period.

4. The pixel driving circuit according to claim 1, wherein the electrowetting pixel device transitions from an operating state to a non-operating state, and then transitions from the non-operating state to the operating state.

5. The pixel driving circuit according to claim 4, wherein inks in the electrowetting pixel device transitions from a contracted state to an expanded state, and then transitions from the expanded state to the contracted state.

6. The pixel driving circuit according to claim 1, wherein the first switch unit is controlled by a first pulse signal output by the sequential control unit, and the second switch unit is controlled by a second pulse signal output by the sequential control unit;

a gray-scale brightness of the electrowetting pixel device is related to a duty cycle of the first pulse signal and a duty cycle of the second pulse signal.

7. The pixel driving circuit according to claim 1, further comprising: a first current limiting unit and a second current limiting unit; wherein the first current limiting unit is in-series connected between the first electrode of the electrowetting pixel device and the power supply unit; the second current limiting unit is in-series connected between the second electrode of the electrowetting pixel device and the power supply unit.

8. The pixel driving circuit according to claim 7, wherein the first current limiting unit comprises a first resistor; the first resistor is in-series connected between the first electrode of the electrowetting pixel device and the power supply unit.

9. The pixel driving circuit according to claim 7, wherein the second current limiting unit comprises a second resistor; the second resistor is in-series connected between the second electrode of the electrowetting pixel device and the power supply unit.

10. The pixel driving circuit according to claim 7, wherein the driving voltage output by the power supply unit is loaded on the first electrode of the electrowetting pixel device through the first current limiting unit; the driving voltage output by the power supply unit also loads on the second electrode of the electrowetting pixel device through the second current limiting unit.

11. The pixel driving circuit according to claim 1, wherein the first switch unit comprises a first switch tube; a control end of the first switch tube is electrically connected to the sequential control unit; the first switch tube is in-series connected between the first electrode of the electrowetting pixel device and the ground.

12. The pixel driving circuit according to claim 11, wherein the first switch tube is an N-Metal-Oxide-Semiconductor (NMOS) tube.

13. The pixel driving circuit according to claim 12, wherein the first switch tube is controlled by a first control signal output by the sequential control unit; when the first control signal is at a high voltage level, the first switch tube is turned on; when the first control signal is at a low voltage level, the first switch tube is turned off.

14. The pixel driving circuit according to claim 1, wherein the second switch unit comprises a second switch tube; a control end of the second switch tube is electrically connected to the sequential control unit; the second switch tube is in-series connected between the second electrode of the electrowetting pixel device and the ground.

15. The pixel driving circuit according to claim 14, wherein the second switch tube is an N-Metal-Oxide-Semiconductor (NMOS) tube.

16. The pixel driving circuit according to claim 15, wherein the second switch tube is controlled by a second control signal output by the sequential control unit; when the second control signal is at a high voltage level, the second switch tube is turned on; when the second control signal is at a low voltage level, the second switch tube is turned off.

17. An electrowetting display, comprising a first substrate, a second substrate, a display panel, and a pixel driving circuit, comprising: a sequential control unit, a first switch unit, a second switch unit, and a power supply unit; wherein the sequential control unit is electrically connected to a control end of the first switch unit and a control end of the second switch unit; the first switch unit is in-series connected between a first electrode of the electrowetting pixel device and ground, and the second switch unit is in-series connected between a second electrode of the electrowetting pixel device and the ground; the power supply unit is electrically connected to the first electrode of the electrowetting pixel device and the second electrode of the electrowetting pixel device; the power supply unit is configured to provide a constant driving voltage; the sequential control unit is configured to periodically control the first switch unit and the second switch unit; one control period comprises a first time period and a second time period; during the first time period, the sequential control unit controls the first switch unit to be turned on and controls the second switch unit to be turned off, and the first electrode of the electrowetting pixel device is conducted to the ground; during the second time period, the sequential control unit controls the first switch unit to be turned off and the second switch unit to be turned on, and the second electrode of the electrowetting pixel device is conducted to the ground; the one control period further comprises a third time period and a fourth time period; during the third time period, the sequential control unit controls the first switch unit to be turned on and the second switch unit to be turned on, and each of the first electrode of the electrowetting pixel device and the second electrode of the electrowetting pixel device is conducted to the ground; during the fourth time period, the sequential control unit controls the first switch unit to be turned off and the second switch unit to be turned off, and each of the first electrode of the electrowetting pixel device and the second electrode of the electrowetting pixel device is conducted to the power supply unit; the third time period is between the first time period and second time period, or the fourth time period is between the first time period and the second time period;

the display panel is disposed between the first substrate and the second substrate; the display panel comprises electrowetting pixel devices arranged in arrays; the pixel driving circuit is electrically connected to the electrowetting pixel device.

* * * * *